United States Patent [19]
Joshi et al.

[11] Patent Number: 5,567,141
[45] Date of Patent: Oct. 22, 1996

[54] OXY-LIQUID FUEL COMBUSTION PROCESS AND APPARATUS

[75] Inventors: Mahendra L. Joshi, Altamonte Spring; Lee Broadway, Eustis; Patrick J. Mohr, Mims; Jack L. Nitzman, Altamonte Spring, all of Fla.

[73] Assignee: Combustion Tec, Inc., Apopka, Fla.

[21] Appl. No.: 512,956

[22] Filed: Aug. 9, 1995

Related U.S. Application Data

[63] Continuation-in-part of Ser. No. 366,621, Dec. 30, 1994.

[51] Int. Cl.$^6$ .................................................. F23C 5/00
[52] U.S. Cl. .......................... 431/8; 431/187; 239/419; 239/422; 239/424; 239/428
[58] Field of Search .............................. 431/8, 181, 187; 239/419, 420, 422, 424, 428

[56] References Cited

U.S. PATENT DOCUMENTS

| | | |
|---|---|---|
| 1,566,177 | 12/1925 | Whitaker . |
| 1,904,469 | 4/1933 | Keller .................................. 431/8 |
| 2,056,531 | 10/1936 | Morton ................................ 431/8 |
| 2,813,754 | 11/1957 | Zielinski . |
| 4,909,727 | 3/1990 | Khinkis . |
| 4,911,637 | 3/1990 | Moore et al. . |
| 5,076,779 | 12/1991 | Kobayashi . |
| 5,135,387 | 8/1992 | Martin et al. . |
| 5,169,304 | 12/1992 | Flament et al. . |
| 5,199,866 | 4/1993 | Joshi et al. . |
| 5,217,363 | 6/1993 | Brais et al. . |
| 5,217,366 | 6/1993 | Laurenceau et al. . |
| 5,251,823 | 10/1993 | Joshi et al. . |
| 5,256,058 | 10/1993 | Slavejkov et al. . |
| 5,292,244 | 3/1994 | Xiong . |
| 5,299,929 | 4/1994 | Yap . |
| 5,346,390 | 9/1994 | Slavejkov et al. . |
| 5,360,171 | 11/1994 | Yap . |

*Primary Examiner*—Carroll B. Dority
*Attorney, Agent, or Firm*—Speckman, Pauley, Fejer

[57] ABSTRACT

A method and apparatus for combustion of a liquid fuel and oxygen which produces a fishtail or fan-shaped flame configuration.

22 Claims, 4 Drawing Sheets

OXY-LIQUID FUEL COMBUSTION PROCESS AND APPARATUS

CROSS-REFERENCE TO RELATED PATENT APPLICATION

This application is a continuation-in-part application of our co-pending application having Ser. No. 08/366,621, filed Dec. 30, 1994.

BACKGROUND OF THE INVENTION

1. Field of the Invention

This invention relates to a method and apparatus for combustion of an oxygen/liquid fuel mixture in a manner which produces a fishtail or fan-shaped flame. Fishtail or fan-shaped flames in high temperature industrial furnaces, such as glass melters, provide enhanced flame coverage resulting in more uniform heat distribution and relatively high radiative heat transmission compared to conventional liquid fuel burners.

2. Description of Prior Art

A frequently encountered issue with 100% oxy-fuel fired, high temperature industrial furnaces, such as glass melters, is the requirement for enhanced flame coverage, particularly in applications involving liquid fuel-oxygen burners. Many conventional burners use a cylindrical burner geometry in which the liquid fuel and oxidant are discharged from a generally cylindrical nozzle, producing a flame profile which diverges at an included angle of 20° to 25°, in a generally conical shape. Conventional oxy-fuel burners, such as are taught by U.S. Pat. No. 5,199,866, having a cylindrical or cone-shaped flame configuration can create hot spots in such furnaces due to limited flame coverage, that is, projected flame area over the load surface, and concentrated heat release through a relatively small flame envelope. Such hot spots, in turn, lead to furnace refractory damage, primarily on furnace crown and/or opposite side walls, increased batch volatilization, and uncontrolled emissions of $NO_x$, $SO_x$, and process particulates. Previous efforts at controlling liquid fuel flame characteristics, in particular flame length, have focused on variations in mean liquid fuel droplet size (denoted by MMD, Mass Median Diameter). See, for example, U.S. Pat. No. 5,251,823 which teaches an adjustable atomizing orifice liquid fuel burner. Some of the more common means for varying liquid droplet size include varying liquid fuel velocity (by varying flow orifice area), atomizing media velocity (by varying flow orifice area), mass flow rate of atomizing media, type of atomizing media (air, oxygen, steam, etc.), and changes in nozzle design (introducing swirl, internal mixing, etc.). However, the extents to which flame lengths can be increased are generally limited due to the size of the particular industrial furnace.

Other known techniques for increasing flame coverage include staggered firing in which a number of oxy-fuel burners on each side of a furnace are staggered in placement to improve the effective load coverage through the use of conical expansion of individual flames. Such an arrangement generally provides better heat distribution than opposed-fired burners. However, such a staggered arrangement can create undesirable cold regions in pocket areas between adjacent burners. To resolve this problem, the number of burners used by a given furnace can be optimized to effectively utilize the load space; however, increasing the number of burners also leads to higher capital costs in burner and flow control equipment and, thus, is not necessarily desirable.

U.S. Pat. No. 5,217,363 teaches an air-cooled oxygen gas burner having a body which forms three concentric metal tubes supported in a cylindrical housing and positioned about a conical bore and a refractory side wall of a furnace. The three concentric tubes can be adjusted with respect to each other to define a nozzle with annular openings of variable size for varying the shape of a flame produced by a mixture of fuel, oxygen and air. The air is fed through an outer chamber for cooling the concentric tube assembly and the furnace refractory positioned about the burner nozzle.

U.S. Pat. Nos. 5,256,058 and 5,346,390 disclose a method and apparatus for generating an oxy-fuel flame. The oxy-fuel flame is produced in a concentric orifice burner and, thus, results in a generally cylindrical flame. A fuel-rich flame is shielded within a fuel-lean or oxygen-rich flame. The flame shielding is controlled in order to achieve a 2-phase turbulent diffusion flame in a precombuster, in order to prevent aspiration of corrosive species, and also to reduce nitrogen oxides formation.

U.S. Pat. No. 5,076,779 discloses a combustion burner operating with segregated combustion zones. Separate oxidant mixing zones and fuel reaction zones are established in a combustion zone in order to dilute oxidant and also to combust fuel under conditions which reduce nitrogen oxides formation.

It is apparent that there is a need for an oxy-fuel burner, in particular, an oxy-liquid fuel burner, which can be used in high-temperature furnaces, such as glass melting furnaces, which provides uniform heat distribution, reduced undesirable emissions, such as nitrogen oxides and sulfur oxides, and which produces a highly radiative and luminous flame.

SUMMARY OF THE INVENTION

It is an object of this invention to provide an apparatus for liquid fuel combustion which produces a fishtail or fan-shaped flame resulting in improved load coverage and a highly radiative flame, particularly for efficient transmission of visible radiation in a wave length range of approximately 500 nanometers to approximately 2000 nanometers, for example.

It is another object of this invention to provide a liquid fuel burner which produces a fishtail or fan-shaped flame, wherein the liquid fuel and oxidant, in particular oxygen, are uniformly distributed in a generally horizontal direction, particularly when discharged from the burner.

It is yet another object of this invention to provide a horizontally diverging burner block which allows the liquid fuel and oxygen discharged from the liquid fuel burner to be further directed outward in a horizontally diverging direction in order to enhance development of the fishtail or fan-shaped flame configuration.

It is yet another object of this invention to provide a method for combustion of an oxy-liquid fuel mixture which produces a fishtail or fan-shaped flame configuration.

These and other objects and features of this invention are accomplished by a method and apparatus for oxygen-liquid fuel combustion in which the liquid fuel is atomized and the atomized liquid fuel is discharged from a liquid fuel conduit in a generally planar fuel layer, forming a fishtail or fan-shaped fuel layer having a generally planar upper boundary and a generally planar lower boundary. Oxygen is discharged from an oxygen conduit disposed around the liquid fuel conduit so as to completely encircle the fishtail or fan-shaped liquid fuel layer. By surrounding the fishtail or fan-shaped atomized liquid fuel layer with oxygen, cooling of the burner block surfaces with which the developing flame comes in contact is provided.

More particularly, the oxy-liquid fuel burner of this invention comprises a liquid fuel conduit disposed within an oxygen conduit whereby an annular region is formed between the exterior surface of the liquid fuel conduit and the interior surface of the oxygen conduit. The liquid fuel conduit comprises atomization means for atomizing the liquid and shaping means for discharging the liquid fuel from the liquid fuel discharge and of the liquid fuel conduit in an outwardly divergent, fishtail or fan-shaped configuration. The oxygen conduit comprises means for discharging the oxygen in an outwardly divergent, fishtail or fan-shaped configuration corresponding to the liquid fuel configuration and substantially encircling the atomized liquid fuel. In accordance with a preferred embodiment of this invention, the oxygen conduit comprises a generally rectangular cross-section at the oxygen discharge end of the oxygen conduit, the longer side of the rectangular cross-section being disposed in a generally horizontal direction so as to provide a layered fishtail or fan-shaped combustible mixture which is fuel-rich in the center and generally horizontally disposed.

In accordance with another preferred embodiment of this invention, the oxy-liquid fuel burner is attachable to a burner block having a burner block inlet and a burner block outlet and a communication between the burner block inlet and the burner block outlet. In accordance with this preferred embodiment, the atomized liquid fuel and oxygen are injected into the burner block inlet whereby the atomized and injected liquid fuel has an outwardly divergent, fishtail or fan-shaped configuration and the oxygen encircles the atomized and injected liquid fuel, thereby forming upon ignition a flame having an outwardly divergent, fishtail or fan-shaped configuration downstream of the burner block. Particularly in accordance with this preferred embodiment of the invention, discharge of the oxygen from the oxygen conduit in a manner which encircles the atomized and injected liquid is critical to provide the cooling of the burner block surfaces forming the communication between the burner block inlet and outlet. In the absence of such cooling, the burner block would overheat resulting in its destruction and possibly resulting in destruction of the burner.

One preferred embodiment of the present invention, comprises a configuration in which a gaseous fuel/oxygen burner as described in co-pending U.S. patent application Ser. No. 08/366,621, is modified to fire liquid fuels such as No. 2 fuel oil (diesel fuel), No. 4 fuel oil, No. 6 fuel oil, or Bunker-C type fuel oil. In accordance with this preferred embodiment, a liquid fuel atomizer is positioned within the unused natural gas conduit or manifold which, in turn, is positioned within the oxygen conduit or manifold. Both the natural gas manifold and the oxygen manifold preferably have a rectangular cross-section at the exit plane for producing a fishtail or fan-shaped oxygen flowstream. For producing a fishtail or fan-shaped flame, the liquid fuel atomizer produces an atomized spray pattern to combust within the planar oxygen streams produced by the burner oxygen conditioning section.

In accordance with yet another preferred embodiment of this invention, the oxidant conduit/manifold has a generally square-shape cross-section at an upstream location and converges in a generally vertical direction and diverges in a generally horizontal direction to form the generally rectangular cross-section at the exit plane. The combined converging and diverging effect, as a result of the "outside geometry" of the gaseous fuel conduit/manifold and overall geometry of the oxygen conduit/manifold, produces a net transfer of momentum of the oxygen from a generally vertical plane to a generally horizontal plane. Thus, the oxygen is discharged from the oxygen conduit in a relatively wide and uniformly distributed fashion.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
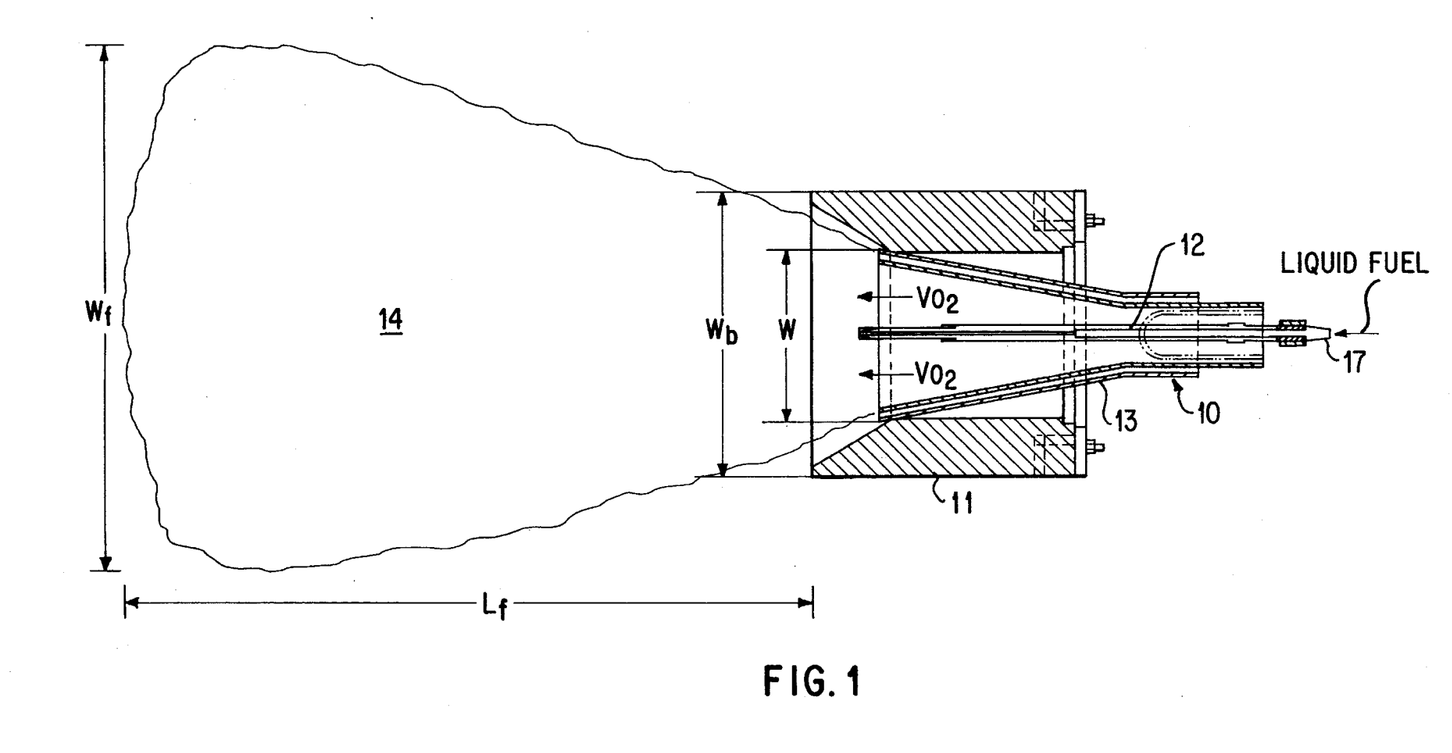
FIG. 1 is a top view of an oxy-liquid fuel burner in accordance with one embodiment of this invention.
Figure 2:
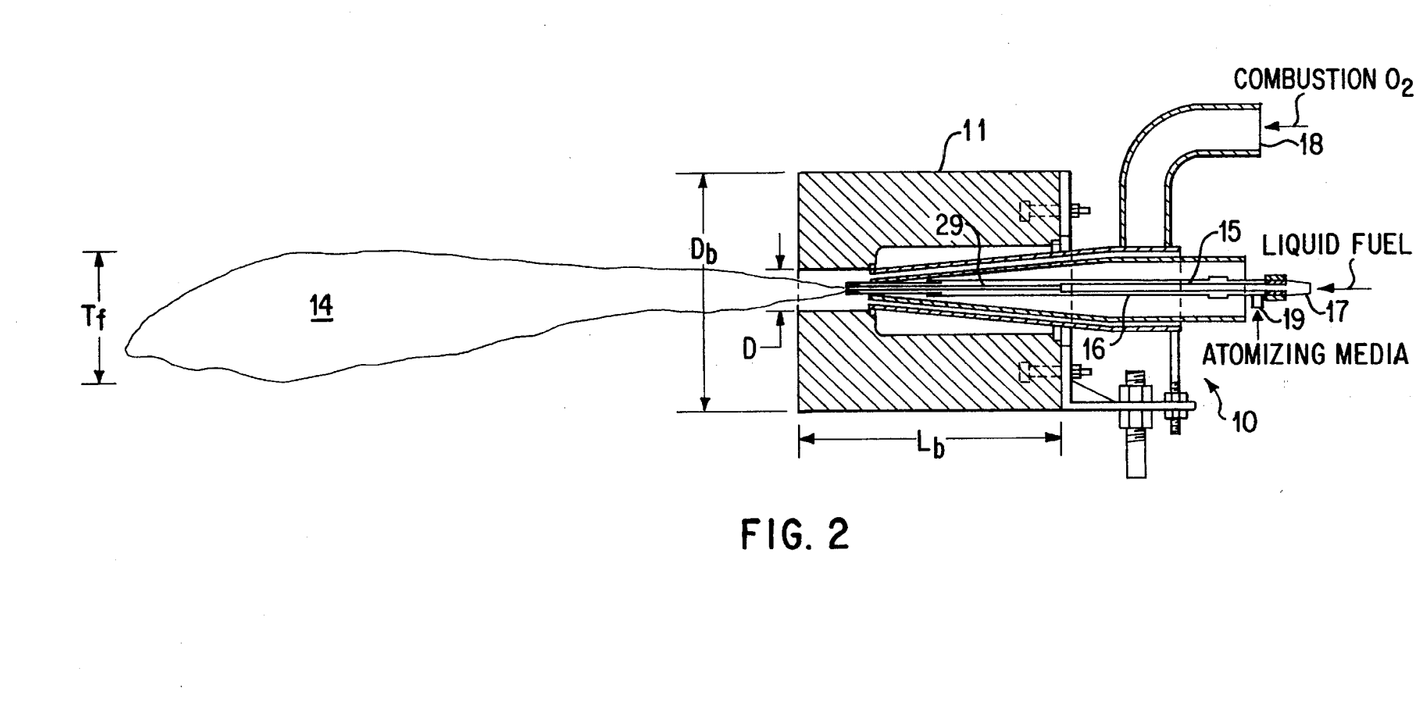
FIG. 2 is a side view of the oxy-liquid fuel burner shown in FIG. 1.
Figure 3:
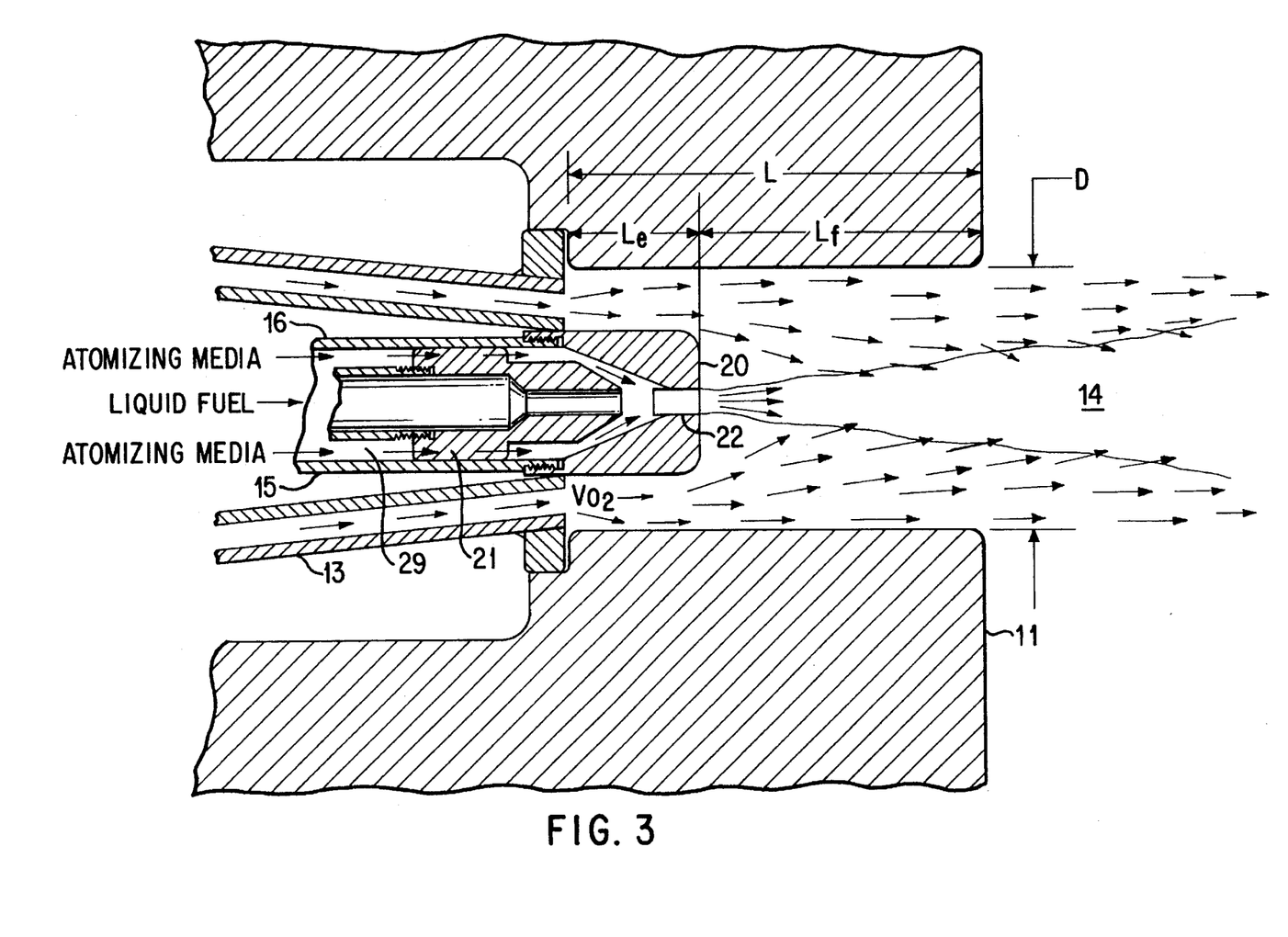
FIG. 3 is a cross-sectional side view of the oxygen/liquid fuel discharge end of the oxy-fuel burner in accordance with one embodiment of this invention.
Figure 4A:
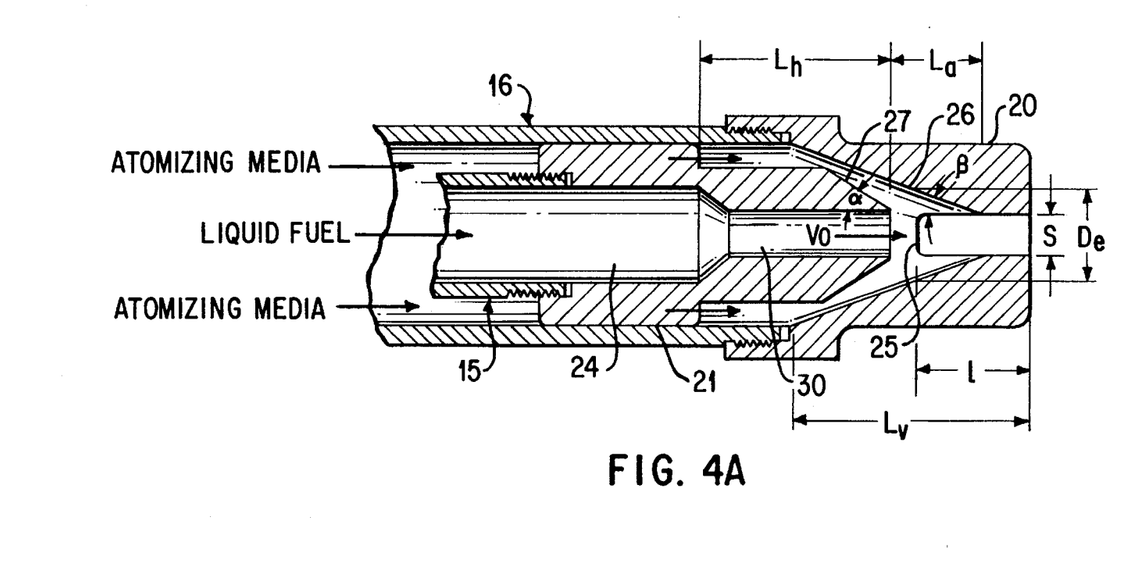
FIG. 4 is cross-sectional view of the liquid fuel conduit, together with specific components thereof shown in a perspective view, of the oxy-liquid fuel burner in accordance with one embodiment of this invention.
Figure 4B:
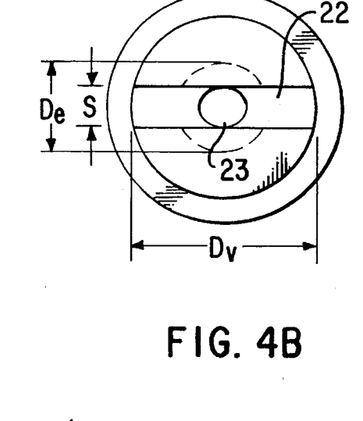
Figure 4C:
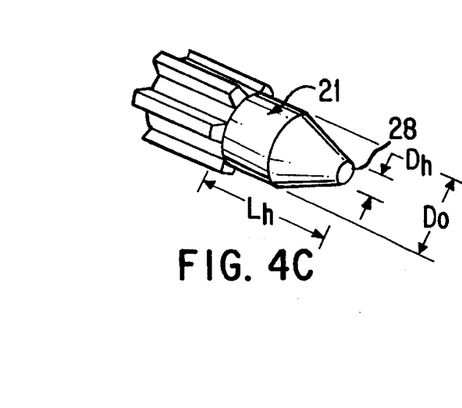
Figure 4D:
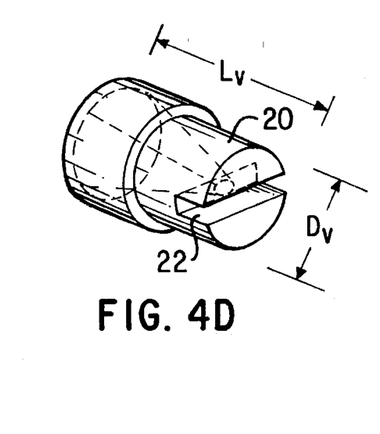

Referring to FIGS. 1–3, a liquid fuel is introduced into liquid conduit 12 through liquid fuel inlet 17, and atomizing media is introduced into liquid fuel conduit 12 through atomizing media inlet 19. As may be more clearly seen in FIG. 3 and 4, liquid fuel conduit 12 comprises inner tubular member 15 into which liquid fuel is introduced and outer tubular member 16 concentrically disposed around inner tubular member 15 and forming an annulus for flow of atomizing media. Combustion oxygen is introduced into oxygen conduit 13 disposed around liquid fuel conduit 12 through oxygen inlet 18.

In accordance with the method for combustion of a liquid fuel of this invention, the liquid fuel is atomized and discharged from liquid fuel conduit 12 in a manner by which the discharged atomized liquid fuel has an outwardly divergent, fishtail or fan-shaped configuration. Oxygen is discharged from oxygen conduit 13 such that the discharged oxygen encircles the outwardly divergent, fishtail or fan-shaped configuration of liquid fuel, thereby forming upon ignition a liquid fuel flame having an outwardly divergent, fishtailed shape 14 as shown in FIG. 1.

In accordance with the method and apparatus of this invention, a fishtail or fan-shaped atomized liquid fuel spray is generated by unique liquid fuel atomization and shape conditioning processes in which the fuel is atomized and at the same time injected out of the atomizer in the form of a fishtail or fan-shaped spray pattern. The fishtail or fan-shaped flame is a continuing process after the liquid fuel spray is generated in the form of a fan-shaped spray in which the oxygen required for combustion is allowed to mix with the atomized spray in a specific configuration to combust and form a fan-shaped flame.

There are at least two elements of the oxy-liquid fuel burner of this invention which govern the formation of a fan-shaped flame—the exit of the oxygen conduit, that is the combustion oxygen nozzle, and the liquid fuel atomizer.

The heart of the present invention is liquid fuel conduit 12 which comprises inner tubular member 15 concentrically disposed within outer tubular member 16 and forming atomization fluid annulus 29 between inner tubular member 15 and outer tubular member 16. Secured to the liquid fuel discharge end of outer tubular member 16 is atomizing venturi 20, said atomizing venturi 20 having a tapering internal geometry, which taper converges in the direction away from outer tubular member 16 and transforms into slot-shaped venturi discharge 22. The venturi taper 26 of atomizing venturi 20 extends forward of the rear edge of slot-shaped venturi discharge 22 and, in this manner, forms flatted elliptical orifice 23, as shown in FIG. 4, at the rear edge of slot-shaped venturi discharge 22.

The process of atomization by the oxy-liquid fuel burner in accordance with this invention occurs in three stages. In the first stage, the angular shear stage, the liquid fuel jet discharged from liquid fuel tip 21 is sheared from all sides by an annular stream of atomizing media flowing through atomization fluid annulus 29. The stream of atomizing media shears the liquid fuel jet at an angle determined by the angle of venturi taper 26 and fuel tip taper 27 into small droplets or ligaments. The atomization process occurs mainly by inertial forces exerted by the angular stream of atomizing media. As a result, the "solid" structure of the liquid fuel jet is more or less destroyed.

In the second stage of the atomization process, a mixture of pressurized liquid fuel and atomizing media, subsequent to the angular shear process of the first stage, are forced to exit through a predetermined shape, in particular flatted elliptical orifice 23, as shown in FIG. 4 for the second stage of atomization. The 2-phase mixture, atomizing media and liquid fuel, is discharged at a predetermined velocity and pressure through flatted elliptical orifice 23 which, in turn, creates additional turbulence and instability on the upstream liquid fuel jet surface, thereby providing additional atomization of the liquid fuel.

In the third stage of atomization, the spray flatness control stage, the 2-phase mixture of liquid fuel and atomizing media, after being ejected through flatted elliptical orifice 23, is compressed between the parallel planes of slot-shaped venturi discharge 22 at the exit of atomizing venturi 20. The direction control and pressure provided by the top and bottom parallel plane surfaces of slot-shaped venturi discharge 22 of atomizing venturi 20 are instrumental in creating the desired fan-shaped or fishtail liquid fuel spray pattern. The degrees of flatness and atomization are controlled by various design parameters. The range of various parameters is given for acceptable performance of the oxy-liquid fuel burner in accordance with this invention for various types of liquid fuels, using either oxygen or compressed air as an atomizing medium, and oxygen for combustion in Table I.

After exiting liquid fuel conduit 12, the atomized liquid fuel spray, having a fishtail or fan-shaped configuration, is sandwiched between top and bottom layers of combustion oxygen discharged from oxygen conduit 13, developing a fuel-rich center core, oxygen-rich top and bottom layers, and critically, oxygen-rich left and right side layers. That is, the combustion oxygen completely encircles the fuel-rich center core, thereby providing for convective cooling of the surfaces of burner block 11, when the oxy-liquid fuel burner of this invention is used in conjunction with burner block 11. In this case, partial combustion occurs within burner block 11, raising the pressure and temperature of the combustion products within burner block 11, thereby pushing hot gases to expand in all directions. However, the burner block, having a fixed height of dimension D as shown in FIG. 3, prohibits expansion of gases in a vertical direction, thus forcing the hot combustion gases to expand in a horizontal direction. In this manner, burner block 11 provides assistance to the combustion gases in the formation of a more uniform fishtail or fan-shaped flame configuration.

Another factor in the successful operation of the oxy-liquid fuel burner in accordance with this invention is the lower combustion oxygen velocity exiting oxygen conduit 13 which enables very fuel-rich combustion occurring in the central horizontal plane of the atomized liquid fuel spray, thereby allowing slower reaction rates and burnout of the liquid fuel within burner block 11.

TABLE 1

| | PREFERRED PARAMETERS DIMENSIONLESS RATIOS AND ANGLES | | | | | | | | | | | | | | | | | |
|---|---|---|---|---|---|---|---|---|---|---|---|---|---|---|---|---|---|---|
| | Oil Tip and Atomizing Venturi Parameters | | | | | | | | | | | | | Burner Block Parameters | | | | |
| FIRING RATE | $\alpha$ | $\beta$ | $\frac{L_v}{D_v}$ | $\frac{L_h}{D_h}$ | $\frac{L_v}{l}$ | $\frac{l}{s}$ | $\frac{D_v}{D_e}$ | $\frac{D_o}{D_h}$ | $\frac{L_h}{D_o}$ | $\frac{L_a}{D_h}$ | $\frac{L_e}{L}$ | $V_{oil}$ (ft/sec) | $V_{am}$ (ft/sec) | $V_{O2}$ (ft/sec) | $\frac{L}{D}$ | $\gamma$ | $L_b$ (in) | $W_b$ (in) | $D_b$ (in) |
| 0.5 to 20 MM Btu/hr | 10° to 40° | 10° to 40° | 1 to 2 | 3 to 5 | 1.5 to 3 | 1 to 6 | 1.5 to 3 | 2 to 5 | 1 to 3 | 0.5 to 4 | 0.10 to 0.75 | 5 to 50 | 100 to 1000 | 5 to 100 | 1.5 to 2.5 | 10 to 30 | 10 to 18 | 12 to 24 | 9 to 16 |

Nomenclature (Refer to FIGS. 2 and 3):
$\alpha$ = Oil tip external taper angle
$\beta$ = Atomizing venturi internal taper angle
$L_v$ = Length of atomizing venturi
$D_v$ = External diameter of atomizing venturi
$L_h$ = Length of oil hole
$D_h$ = Diameter of oil hole
$l$ = Length of atomizing venturi slot
$s$ = Slot height
$D_e$ = Entrance diameter of atomizing venturi at slot entrance
$D_o$ = External diameter of oil tip
$L_e$ = Atomizing venturi extension into the burner block
$L_a$ = Offset distance between oil tip face and end of taper inside atomizing venturi
$V_{oil}$ = Fuel oil velocity (ft/sec) leaving oil tip
$V_{am}$ = Atomizing media velocity leaving flatted ellipse
$L, D$ = Length and depth of the flame region of the burner block
$V_b, W_b, D_b$ = Length, width and depth of burner block
$\gamma$ = Divergence angle of the burner block exit
$V_{O2}$ = Oxygen velocity leaving combustion oxidant nozzle The preferred dimensionless ratios and angles of the oxy-liquid fuel burner in accordance with this invention are shown in Table I. Fuel tip taper 27 preferably has an external angle α and venturi taper 26 preferably has an atomizing venturi internal angle β, both of which are shown in FIG. 4. Both angles are designed to force the annular stream of atomizing media from atomization fluid annulus 29 to shear the liquid fuel jet at an angle. Lower angles delay the shear process while higher angles accelerate the shear process. A proper balance between the necessary guidance of the atomizing media streamlines and the point of intersection between the liquid fuel jet and atomizing media is required. In accordance with one preferred embodiment of this invention, angles α and β are preferably in the range of about 10° to 40°. These angles are critical to the initial breakdown of the liquid fuel jet. They also provide a mean direction control of the mixture before passing through flatted elliptical orifice 23 for secondary atomization.

$L_v$ is defined as the length of atomizing venturi 20 and $D_v$ is defined as the external diameter of atomizing venturi 20, both of which are shown in FIG. 4. In accordance with the preferred embodiment of this invention, the ratio of $L_v/D_v$ is in the range of 1 to 2. The length $L_v$ is such that it can accommodate the atomizing venturi internal angle β as discussed hereinabove.

$L_h$ is defined as the length of fuel oil opening 30 as shown in FIG. 4 and $D_h$ is defined as the diameter of liquid fuel opening 30. The alteration of diameter $D_h$ is used to generate proper liquid fuel velocity, depending on the type of liquid fuel used. Length $L_h$ is designed to accommodate liquid fuel tip external angle α as discussed hereinabove. Accordingly, it is preferred that the ratio of $L_h/D_h$ is in the range of about 3 to 5. l is defined as the length or depth of slot-shaped venturi discharge as shown in FIG. 4. In order to accommodate atomizing venturi internal angle β and provide sufficient guidance and degree of flatness control of the atomized liquid spray, the ratio of $L_v/l$ is preferably in the range of about 1.5 to 3.0.

s is defined as the height of slot-shaped venturi discharge 22. Accordingly, the ratio of $l/s$ is critical for controlling degree of atomization and degree of spray flatness. Higher ratios tend to increase flatness or spread of the spray pattern, whereas lower ratios tend to decrease flatness and spread of the spray pattern. On the other hand, a higher ratio decreases the degree of atomization due to regrouping of already atomized liquid fuel droplets. Accordingly, it is preferred that the ratio of $l/s$ is in the range of about 1 to 6.

$D_e$ defines the internal diameter of atomizing venturi 20 in the plane of the rear edge of slot-shaped venturi discharge 22, that is at the point of entry of the mixture of liquid fuel and atomizing media into slot-shaped venturi discharge 22. The ratio of $D_v/D_e$ defines the entrance diameter of atomizing venturi 20 at the entrance to slot-shaped venturi discharge 22 with respect to the outside diameter of atomizing venturi 20. The ratio $D_v/D_e$, is preferably in the range of about 1.5 to 3. This range is preferred for providing proper atomization of the liquid before entering slot-shaped venturi discharge 22 for final "directional atomization" within slot-shaped venturi discharge 22. The particular ratio selected is, in part, also based upon the firing rate and degree of flatness desired.

$D_o$ defines the external diameter of liquid fuel tip 21. The ratio of the external diameter of liquid fuel tip 21 to the diameter $D_h$ of fuel oil opening 30 is preferably in the range of about 2 to 5. This ratio is dependent on the firing rate (liquid fuel flow rate) and the liquid fuel tip external angle α for angular shearing of the liquid jet by atomizing media. Ratios outside of this range generally produce unsatisfactory atomization.

The ratio of the length $L_h$ of liquid fuel opening 30 to the external diameter $D_o$ of liquid fuel tip 21 is preferably in the range of about 1 to 3 depending upon the angle of shear of the liquid fuel jet. We have found that ratios outside of this range generally produce unsatisfactory atomization.

$L_s$ is defined as the offset distance between the face of liquid fuel tip 21 and the end of venturi taper 26. The ratio $L_a/D_h$ (diameter of liquid fuel opening 30) is preferably in the range of about 0.5 to 4. This is an experimentally evaluated ratio for proper atomization of various grades of liquid fuel using either compressed air or oxygen as the atomizing medium. Variation in the offset distance $L_a$ between the face of liquid fuel tip 21 and venturi taper 26 inside of atomizing venturi 20 causes a change in the degree of atomization. A larger distance $L_a$ causes more premixing of liquid fuel and atomizing media while a shorter distance $L_a$ provides less premixing of liquid fuel and atomizing media. In accordance with one preferred embodiment of this invention, liquid fuel tip 21 is adjustable in the direction designated by arrows 24 in FIG. 4 to enable variation in the offset distance $L_a$. This distance is adjusted for a given fuel atomizing media and firing rate. The variation in the distance $L_a$ results in a variation of the flame characteristics, in particular flame width $W_f$ as shown in FIG. 1.

L is defined as the length of the flame region of burner block 11 as shown in FIG. 3 and $L_e$ is defined as the length of the extension of atomizing venturi 20 into burner block 11. In accordance with a preferred embodiment of this invention, the ratio of $L_e/L$ is in the range of about 0.10 to 0.75. A ratio smaller than the above range would cause a recirculation of the fuel spray and, thus, "dirty" operation, requiring more cleaning and maintenance of the burner. On the other hand, ratios higher than the above range would produce an excessive radiative heating of the atomizer assembly due to the high temperature from this environment. Accordingly, selection of the ratio of $L_e/L$ within this range will provide a more maintenance free burner operation.

Another critical factor in the proper operation of the oxy-liquid fuel burner of this invention is the velocity of the liquid fuel at the exit liquid fuel tip 21. In accordance with one embodiment of this invention, the velocity $V_{oil}$ is preferably less than about 50 feet per second for liquid fuels, such as fuel oils No. 2, No. 6, etc. For a fixed liquid fuel tip opening diameter ($D_h$), the velocity of the liquid fuel will vary depending on the firing rate. A velocity higher than about 50 feet per second would cause atomization difficulties due to lack of disturbance of the liquid fuel jet.

The velocity $V_{am}$ of the atomizing media is preferably less than about 1000 feet per second, depending upon the type of atomizing medium employed. The flow velocity of the atomizing media is fixed by the height s of slot-shaped venturi discharge 22 and the entrance diameter $D_e$ at the entrance to slot-shaped venturi discharge 22. It will be apparent to those skilled in the art that the velocity can also be varied by changing the mass flow rate of the atomizing medium.

Preferably, the velocity $V_{O2}$ of the combustion oxygen at the exit of oxygen conduit 13 is less than about 100 feet per second. Higher velocities cause intense combustion within burner block 11 which could melt both burner block 11 and the atomization portion of liquid fuel conduit 12.

$L_b$, $W_b$ and $D_b$ are defined as the length, width and depth, respectively, of burner block 11. The burner block flame cavity dimensions, ratio L/D and divergence angle as described in our co-pending application having Ser. No. 08/366,621 are similar for the oxy-liquid fuel burner of this invention. We have discovered, during laboratory experiments, that the oxy-liquid fuel burner of this invention in accordance with one preferred embodiment of this invention has a turndown ratio of about 10:1 for a firing range of 1.00 to 10 million BTU's per hour. This extraordinary turndown capability is effected for the following preferred parameters:

$\alpha=30°$ $\beta=20°$ $l/s=4$ $D_0/D_h=3.3$ $D_o/D_e=2.4$ $L/D=1.6$ $\gamma=11°$ $V_{oil}=4$ to 40 feet per second $V_{O2}=5$ to 100 feet per second $V_{am}=$ less than about 600 feet per second.

The burner was extensively test fired in a firing chamber. Liquid fuel (No. 2 and No. 6 fuel oils) at 7 gallons per hour to 56 gallons per hour was fired in the unsealed firing chamber. The flames were approximately 5–8 feet long and 3–5 feet wide. In an actual furnace, or in a sealed environment, the flames are approximately 20 to 25% longer. The atomizing media (compressed air or oxygen) supply pressure varied between 10 to 30 psig, whereas liquid fuel supply pressure varied between 20 to 60 psig. The combustion oxygen supply pressure varied between 1 to 10 inches water column in the same firing range. The atomization was complete and the flames were very luminous. Both the burner and burner block gave a maintenance free performance over the entire firing range.

Our co-pending U.S. patent application, Ser. No. 08/366,621 describes and claims an oxy-gas fuel fired burner which produces a fishtail or fan-shaped flame. In accordance with the teachings of this co-pending application, the natural gas manifold is disposed within the oxygen manifold and both the oxygen manifold and the natural manifold form corresponding rectangular nozzle outlets at their respective exit planes in order to provide the required fishtail or fan-shaped flame. In accordance with one preferred embodiment of this invention, liquid fuel conduit 12 is inserted into the natural gas manifold. In this way, the burner disclosed by our prior co-pending application can be retrofit to operate as an oxy-liquid fuel burner in accordance with this invention.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An oxy-liquid fuel burner comprising:

a liquid fuel conduit having a liquid fuel inlet end and a liquid fuel discharge end;

an oxygen conduit disposed around said liquid fuel conduit and forming an annular region between an exterior surface of said liquid fuel conduit and an interior surface of said oxygen conduit;

said liquid fuel conduit comprising atomization means for atomization of a liquid fuel and shaping means for discharging said liquid fuel from said liquid fuel discharge end in an outwardly divergent, fishtail configuration; and said oxygen conduit comprising means for discharging oxygen in an outwardly divergent, fishtail configuration corresponding to said liquid fuel configuration and substantially encircling said liquid fuel.

2. An oxy-liquid fuel burner in accordance with claim 1, wherein said oxygen conduit comprises a generally rectangular cross-section at an oxygen discharge end, the longer side of said rectangular cross-section disposed in a generally horizontal direction.

3. An oxy-liquid fuel burner in accordance with claim 1, wherein said liquid fuel conduit comprises an inner tubular member concentrically disposed within an outer tubular member and forming an atomization fluid annulus between said inner tubular member and said outer tubular member.

4. An oxy-liquid fuel burner in accordance with claim 3 wherein said atomization means and shaping means includes an atomizing venturi secured to said outer tubular member at said liquid fuel discharge end of said liquid fuel conduit, said atomizing venturi having a tapering internal geometry, said taper converging in a direction away from said outer tubular member and transforming into a slot-shaped venturi discharge, said taper extending beyond a rear edge of said slot-shaped venturi discharge, whereby said atomizing venturi forms a flatted elliptical orifice at said rear edge of said slot-shaped venturi discharge.

5. An oxy-liquid fuel burner in accordance with claim 4 wherein said atomization means includes a liquid fuel tip secured to said inner tubular member at said discharge end of said liquid fuel conduit, said liquid fuel tip longitudinally adjustably disposed within the interior of said atomizing venturi.

6. An oxy-liquid fuel burner in accordance with claim 5, wherein said liquid fuel tip forms a substantially circular opening.

7. An oxy-liquid fuel burner in accordance with claim 6, wherein said liquid fuel tip has an external taper which converges in the direction of said slot-shaped venturi discharge.

8. A method for combustion of a liquid fuel, said method comprising the steps of:

atomizing said liquid fuel;

discharging said atomized liquid fuel from a liquid fuel conduit, said discharged atomized liquid fuel having an outwardly divergent, fishtail configuration; and discharging oxygen from an oxygen conduit surrounding said liquid fuel conduit, said discharged oxygen encircling said outwardly divergent, fishtail configuration of liquid fuel, thereby forming upon ignition a liquid fuel flame having an outwardly divergent, fishtail shape.

9. A method in accordance with claim 8, wherein said liquid fuel is discharged through a liquid fuel tip of a liquid fuel conduit, said liquid fuel tip having a generally circular opening, and said discharged liquid fuel is sheared by an annular stream of an atomizing media from an atomizing media conduit disposed around said liquid fuel conduit and forming an annulus between said liquid fuel conduit and said atomizing media conduit.

10. A method in accordance with claim 9, wherein said atomized liquid fuel is discharged from an atomizing venturi secured to a discharge end of said atomizing media conduit, said atomizing venturi forming a flatted elliptical opening which transforms into a slotted discharge opening.

11. A method in accordance with claim 10, wherein said liquid fuel tip has an external taper in the direction of discharge of said liquid fuel and said atomizing venturi has an internal taper in the direction of discharge of said atomized liquid fuel, whereby said atomizing media shears said liquid fuel at an angle with respect to the direction of flow of said liquid fuel, forming a liquid fuel/atomizing media mixture within said atomizing venturi, upstream of said flatted elliptical opening.

12. A method in accordance with claim 11, wherein said liquid fuel/atomizing media mixture is discharged through said flatted elliptical opening and subsequently compressed between the parallel planes of said slotted discharge opening.

13. A method in accordance with claim 12, wherein said atomized liquid fuel and said oxygen are discharged into an inlet opening of a burner block, said burner block forming a communication between said inlet opening and an outlet opening, said inlet opening having a generally rectangular cross-section which is in general conformance with the rectangular discharge end of said oxygen conduit, and said communication diverging from said inlet opening to said outlet opening, said outlet opening having a generally rectangular cross-section which is larger then the cross-section of said inlet opening.

14. A method in accordance with claim 9, wherein said atomizing media is a gaseous media selected from the group consisting of oxygen, compressed air, steam and mixtures thereof.

15. In an oxy-liquid fuel burner which is attachable to a burner block having a burner block inlet and a burner block outlet and a communication between said burner block inlet and said burner block outlet, the improvement comprising:

means for atomizing and injecting a liquid fuel into said burner block inlet, whereby said atomized and injected liquid fuel has an outwardly divergent, fishtail configuration; and oxygen means for injecting oxygen into said burner block inlet, whereby said oxygen encircles said atomized and injected liquid fuel, thereby forming upon ignition a flame having an outwardly divergent, fishtail configuration downstream of said burner block.

16. In an oxy-liquid fuel burner in accordance with claim 15, wherein said means for atomizing and injecting said liquid fuel comprises a liquid fuel conduit having a liquid fuel inlet end and a liquid fuel discharge end, said liquid fuel conduit comprising an inner tubular member concentrically disposed within an outer tubular member and forming an atomization fluid annulus between said inner tubular member and said outer tubular member.

17. In an oxy-liquid fuel burner in accordance with claim 16, wherein said means for atomizing and injecting said liquid fuel further comprises an atomizing venturi secured to said outer tubular member at said liquid fuel discharge end of said liquid fuel conduit, said atomizing venturi having a tapering internal geometry, said taper converging in a direction away from said outer tubular member and transforming into a slot-shaped venturi discharge, said taper extending beyond a rear edge of said slot-shaped venturi discharge, whereby said atomizing venturi forms a flatted elliptical orifice at said rear edge of said slot-shaped venturi discharge.

18. In an oxy-liquid fuel burner in accordance with claim 17, wherein said oxygen means comprises an oxygen conduit surrounding said liquid fuel conduit forming an annular region between said liquid fuel conduit and said oxygen conduit, said oxygen conduit having a generally rectangular cross-section at an oxygen discharge end, the longer side of said rectangular cross-section disposed in a generally horizontal direction.

19. In an oxy-liquid fuel burner in accordance with claim 18, wherein said liquid fuel conduit comprises a liquid fuel tip secured to said inner tubular member at said discharge end of said liquid fuel conduit, said liquid fuel tip longitudinally adjustably disposed within the interior of said atomizing venturi.

20. In an oxy-liquid fuel burner in accordance with claim 19, wherein said liquid fuel tip forms a substantially circular opening.

21. In an oxy-liquid fuel burner in accordance with claim 20, wherein said liquid fuel tip has an external taper which converges in the direction of said slot-shaped venturi discharge.

22. In an oxy-liquid fuel burner in accordance with claim 21, wherein said atomizing venturi extends beyond the oxygen discharge end of said oxygen conduit, through said burner block inlet, and into said burner block communication.

* * * * *